United States Patent
Kawamoto et al.

(10) Patent No.: US 10,207,364 B2
(45) Date of Patent: Feb. 19, 2019

(54) LASER WELDING CONDITION DETERMINATION METHOD AND LASER WELDING DEVICE

(71) Applicant: Panasonic Intellectual Property Management Co., Ltd., Osaka (JP)

(72) Inventors: Atsuhiro Kawamoto, Hyogo (JP); Yasushi Mukai, Osaka (JP); Junji Fujiwara, Osaka (JP); Tatsuyuki Nakagawa, Osaka (JP); Tatsuya Ikeda, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 363 days.

(21) Appl. No.: 15/023,679

(22) PCT Filed: Nov. 4, 2014

(86) PCT No.: PCT/JP2014/005538
§ 371 (c)(1),
(2) Date: Mar. 22, 2016

(87) PCT Pub. No.: WO2015/072107
PCT Pub. Date: May 21, 2015

(65) Prior Publication Data
US 2016/0207142 A1  Jul. 21, 2016

(30) Foreign Application Priority Data
Nov. 15, 2013  (JP) .................................. 2013-236426

(51) Int. Cl.
*B23K 26/062* (2014.01)
*B23K 26/21* (2014.01)
(Continued)

(52) U.S. Cl.
CPC ........ *B23K 26/062* (2015.10); *B23K 26/0626* (2013.01); *B23K 26/073* (2013.01);
(Continued)

(58) Field of Classification Search
CPC ... B23K 26/0062; B23K 26/073; B23K 26/21
(Continued)

(56) References Cited

U.S. PATENT DOCUMENTS 4,649,256 A  3/1987  Minamida et al.
5,237,151 A  8/1993  Maruyama
(Continued)

FOREIGN PATENT DOCUMENTS

JP  2-059188     2/1990
JP  5-049396 B   7/1993
(Continued)

OTHER PUBLICATIONS

International Search Report of PCT application No. PCT/JP2014/005538 dated Dec. 9, 2014.
(Continued)

*Primary Examiner* — Samuel M Heinrich
(74) *Attorney, Agent, or Firm* — Wenderoth, Lind & Ponack, L.L.P.

(57) ABSTRACT

A method for determining a laser welding condition of the present disclosure includes a first step, a second step, and a third step. In the first step, workpiece information indicating characteristics of a workpiece is input. In the second step, laser information indicating characteristics of laser light is input. In the third step, a first welding condition is calculated based on the workpiece information and the laser information, and then displayed. The first welding condition is any one of a recommended laser power of the laser light, a recommended welding speed, a recommended welding pattern, an estimated strength of a welded portion, and an
(Continued)

estimated weld depth of the welded portion. Furthermore, the workpiece information includes a joint shape of the workpiece. Thus, an optimum weld condition can be set while considering a shape of a joint in welding.

9 Claims, 6 Drawing Sheets

(51) Int. Cl.
   B23K 26/073    (2006.01)
   B23K 26/06     (2014.01)
   B23K 26/08     (2014.01)
   B23K 26/26     (2014.01)
   B23K 26/242    (2014.01)
   B23K 26/244    (2014.01)

(52) U.S. Cl.
   CPC ......... *B23K 26/0884* (2013.01); *B23K 26/21* (2015.10); *B23K 26/242* (2015.10); *B23K 26/244* (2015.10); *B23K 26/26* (2013.01)

(58) Field of Classification Search
   USPC .......... 219/121.63, 121.64, 121.83; 700/166
   See application file for complete search history.

(56) References Cited

U.S. PATENT DOCUMENTS

| | | | |
|---|---|---|---|
| 6,243,619 B1 | 6/2001 | Inamasu et al. | |
| 6,535,787 B1 | 3/2003 | Inamasu et al. | |
| 7,050,882 B1 | 5/2006 | Indou et al. | |
| 2002/0008086 A1 | 1/2002 | Fujii et al. | |
| 2011/0238215 A1* | 9/2011 | Yanagawa | G05B 19/42 700/258 |
| 2012/0061363 A1 | 3/2012 | Saunders et al. | |
| 2015/0360319 A1* | 12/2015 | Yagi | B23K 26/262 219/121.64 |
| 2017/0050269 A1* | 2/2017 | Nakagawa | B23K 26/0876 |

FOREIGN PATENT DOCUMENTS

| | | |
|---|---|---|
| JP | 2590539 B | 3/1997 |
| JP | 9-271969 | 10/1997 |
| JP | 10-006048 | 1/1998 |
| JP | 10-015678 | 1/1998 |
| JP | 10-109185 | 4/1998 |
| JP | 11-151586 | 6/1999 |
| JP | 2000-183432 | 6/2000 |
| JP | 2001-276980 | 10/2001 |
| JP | 2007-319922 | 12/2007 |
| JP | 2008-049362 | 3/2008 |
| JP | 2008-119708 | 5/2008 |
| JP | 2012-110905 | 6/2012 |
| WO | 2000/064621 | 11/2000 |
| WO | 2004/109871 | 12/2004 |

OTHER PUBLICATIONS

Extended European Search Report dated Oct. 10, 2016 in corresponding European Application No. 14861981.0.

* cited by examiner

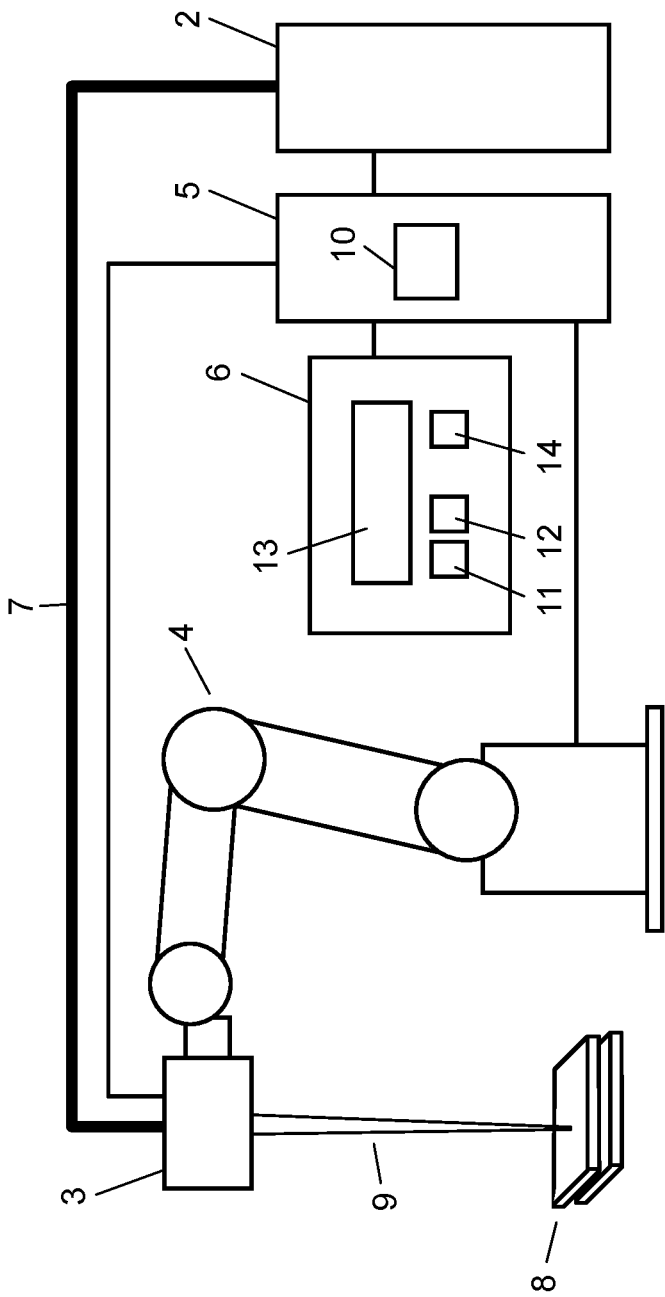

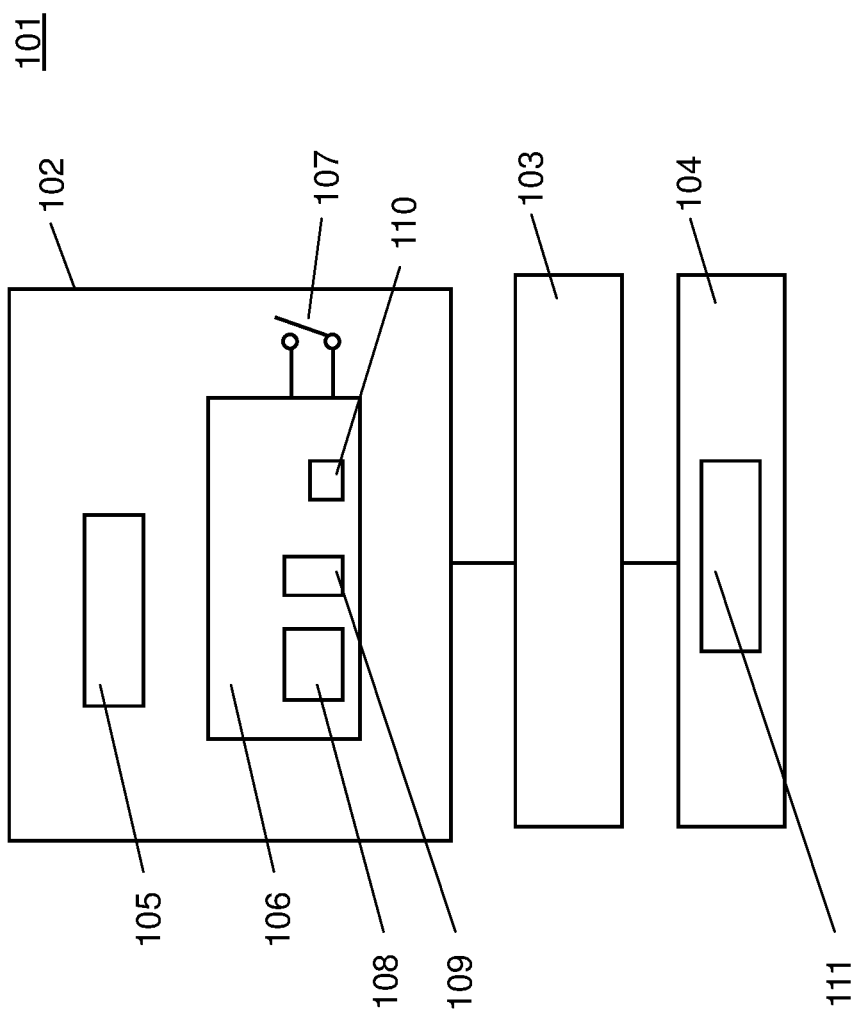

LASER WELDING CONDITION DETERMINATION METHOD AND LASER WELDING DEVICE

This application is a U.S. national stage application of the PCT international application No. PCT/JP2014/005538.

TECHNICAL FIELD

The present disclosure relates to a laser welding condition determination method for determining a laser welding condition in response to a workpiece in laser welding for welding a workpiece by laser light, and to a laser welding device.

BACKGROUND ART

In conventional laser machining, an operator sets a welding condition with respect to a workpiece based on the operator's experience and intuition. Alternatively, the operator changes the welding condition repeatedly while verifying welding results, and finds a welding condition suitable for the workpiece.

Thus, PTL 1 has proposed an interactive NC (Numerical Control) device capable of setting a laser machining condition (laser power, oscillating frequency, duty, and the like) in response to a welding speed for material and a board thickness of a workpiece, in order to lead a machining condition without the need for experience of an operator or verification for each machining.

With reference to FIG. 6, conventional interactive NC device 101 is described. As shown in FIG. 6, interactive NC device 101 includes interactive unit 102, arithmetic processing unit 103, and storage unit 104. Interactive unit 102 includes display section 105, and interactive input section 106. Interactive input section 106 includes laser machining condition display key 107, ten-key 108, cursor key 109, and page key 110. Storage unit 104 stores laser machining condition table 111. Arithmetic processing unit 103 includes a NC program, and selects a laser machining condition based on a command speed input in interactive unit 102 and laser machining condition table 111 in storage unit 104.

Next, a method for setting a laser machining condition by interactive NC device 101 is described.

Firstly, formation of laser machining condition table 111 is described. An operator operates laser machining condition display key 107, ten-key 108, cursor key 109, and page key 110 of interactive input section 106, so as to set material and a board thickness of a workpiece. Then, the operator sets a laser machining condition (laser output, frequency, duty, and gas pressure) in response to a machining speed. Thus, laser machining condition table 111 is formed and stored in storage unit 104.

Next, execution of the NC program using laser machining condition table 111 is described. An operator sets material and a board thickness of a workpiece by interactive unit 102. Thus, the NC program is executed. Subsequently, when the operator sets a command speed by interactive unit 102, the NC program sets laser machining conditions (laser output, frequency, duty, and gas pressure) using the formed laser machining condition table 111.

As mentioned above, once an operator sets laser machining conditions corresponding to material, board thickness, and machining speed of a workpiece, it is not necessary to set subsequent laser machining conditions, and it is possible to set optimum laser machining conditions.

CITATION LIST

Patent Literature

PTL 1: Japanese Patent Application Unexamined Publication No. H2-59188

SUMMARY OF THE INVENTION

However, conventional interactive NC device 101 aims to cut a workpiece, and laser machining conditions are set only based on material and a board thickness of the workpiece. On the other hand, since in welding, optimum laser machining conditions differ depending on the shape of a joint, appropriate welding conditions cannot be set based only on material and a board thickness of a workpiece as described in PTL 1.

A method for determining a laser welding condition and a laser welding device of the present disclosure have an object to easily obtain an optimum laser welding condition.

In order to achieve the above-mentioned object, the method for determining a laser welding condition of the present disclosure includes a first step, a second step, and a third step. In the first step, workpiece information indicating characteristics of a workpiece is input. In the second step, laser information indicating characteristics of laser light is input. In the third step, a first welding condition is calculated based on the workpiece information and the laser information, and then displayed. Furthermore, the first welding condition is any one of a recommended laser power of the laser light, a recommended welding speed, a recommended welding pattern, an estimated strength of a welded portion, and an estimated weld depth of the welded portion. Furthermore, the workpiece information includes a joint shape of the workpiece.

Furthermore, a laser welding device of the present disclosure includes a laser oscillator, a laser head, a robot, a controller, and a welding condition setting unit. The laser head emits laser light, output from the laser oscillator, to a workpiece. To the robot, the laser head is attached. The robot moves the laser head. The controller controls an operation of the robot, and has a welding condition calculation section. The welding condition setting unit is connected to the controller. The welding condition setting unit includes a workpiece information input section, a laser information input section, and a display section. The workpiece information input section is configured to receive an input of the workpiece information indicating the characteristics of the workpiece. The laser information input section is configured to receive an input of the laser information indicating the characteristics of the laser light. The display section displays a first welding condition calculated by the welding condition calculation section based on the workpiece information and the laser information. Furthermore, the first welding condition is any one of a recommended laser power of the laser light, a recommended welding speed, a recommended welding pattern, an estimated strength of a welded portion, and an estimated weld depth of the welded portion. Furthermore, the workpiece information includes a joint shape of the workpiece.

According to the method for determining a laser welding condition and the laser welding device of the present disclosure, also in welding, an optimum weld condition can be set while considering a shape of a joint of the workpiece.

BRIEF DESCRIPTION OF THE DRAWINGS

FIG. 4 shows a schematic configuration of a laser welding device in accordance with a second exemplary embodiment.

FIG. 6 shows a schematic configuration of a conventional interactive NC device.

DESCRIPTION OF EMBODIMENTS

First Exemplary Embodiment

Figure 1:
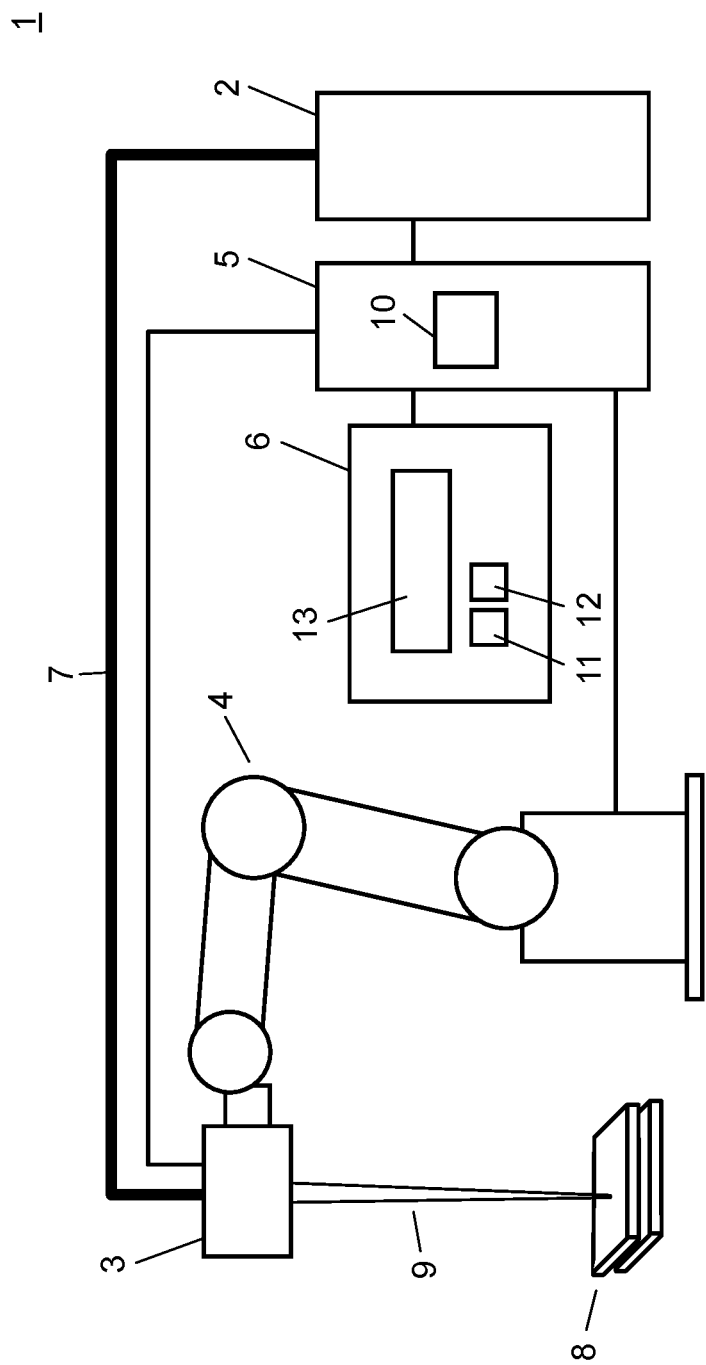
FIG. 1 shows a schematic configuration of a laser welding device in accordance with a first exemplary embodiment.
Figure 2:
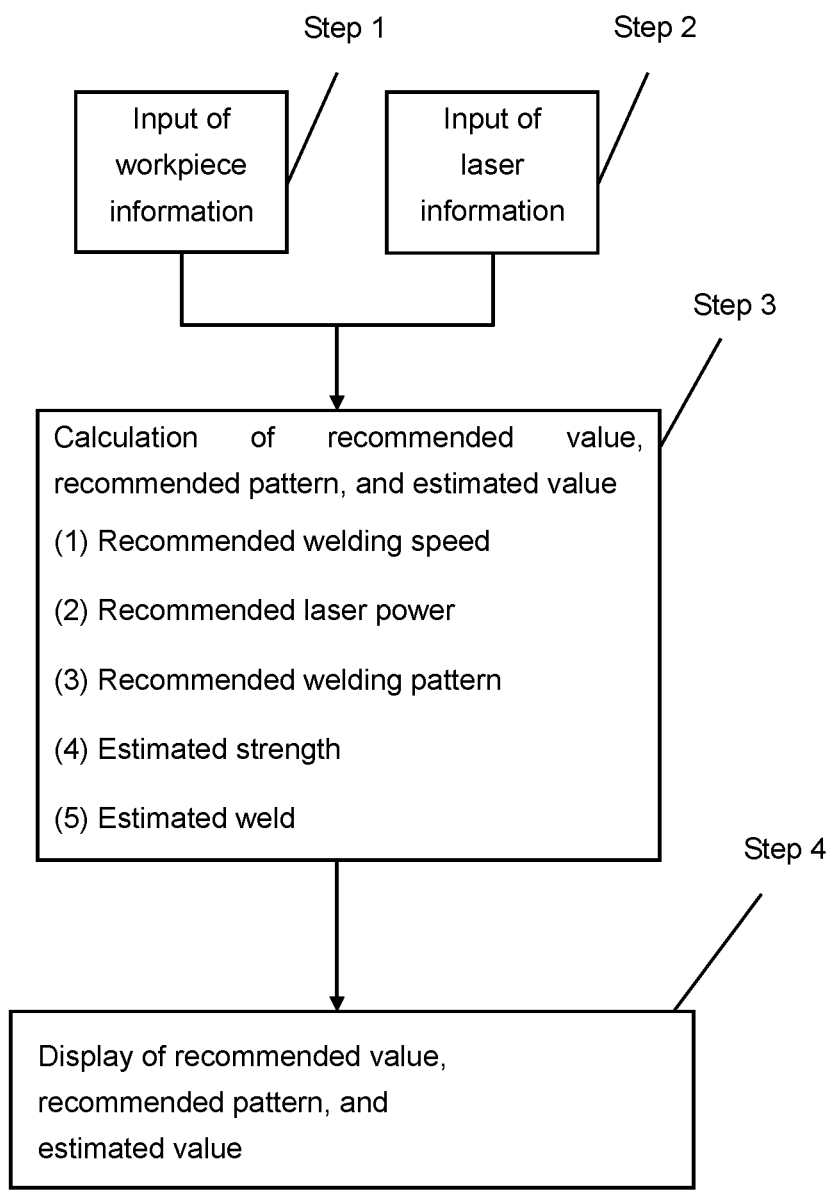
FIG. 2 is a flowchart showing a procedure to determine laser welding conditions in accordance with the first exemplary embodiment.

This exemplary embodiment is described with reference to FIGS. 1 through 3D. FIG. 1 shows a schematic configuration of a laser welding device. FIG. 2 is a flowchart showing a procedure to determine laser welding conditions. FIGS. 3A through 3D are views each showing an example of a joint shape of a workpiece.

As shown in FIG. 1, laser welding device 1 includes laser oscillator 2, laser head 3, robot 4, controller 5, and welding condition setting unit 6. Laser oscillator 2 is coupled to laser head 3 via fiber 7 (optical fiber wire). Laser oscillator 2 oscillates laser, and outputs oscillated laser light to laser head 3 through fiber 7. Laser head 3 emits laser light output by laser oscillator 2 to workpiece 8. That is to say, laser light 9 is emitted from laser head 3 to workpiece 8. Robot 4 has laser head 3 attached at a tip of robot 4, and moves laser head 3. Controller 5 is connected to robot 4 and controls an operation of robot 4. Furthermore, controller 5 is connected to laser head 3 and controls laser head 3. Controller 5 is also connected to laser oscillator 2 and controls laser oscillator 2. Furthermore, controller 5 has welding condition calculation section 10 for calculating welding conditions. Welding condition setting unit 6 is connected to controller 5, and bilaterally communicates with controller 5. Welding condition setting unit 6 includes workpiece information input section 11, laser information input section 12, and display section 13.

Next, a method for determining a laser welding condition by laser welding device 1 before execution of welding is described with reference to FIGS. 1 through 3D.

As shown in step 1 in FIG. 2, an operator inputs workpiece information indicating characteristics of workpiece 8 into workpiece information input section 11 of welding condition setting unit 6 (a first step). The workpiece information includes material, a board thickness, and a joint shape of a workpiece. Examples material of a workpiece include soft steel, stainless steel, aluminum, and the like. Furthermore, when two workpieces are welded to each other, material and a board thickness of each of the workpieces are input into workpiece information input section 11. Furthermore, arrangement of workpieces, corresponding to the joint shape, is also input into workpiece information input section 11.

Figure 3A:
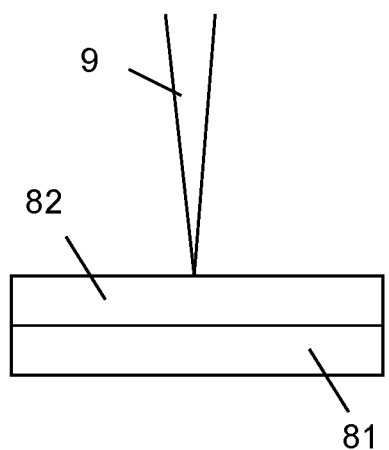
FIG. 3A shows a lap joint.
Figure 3B:
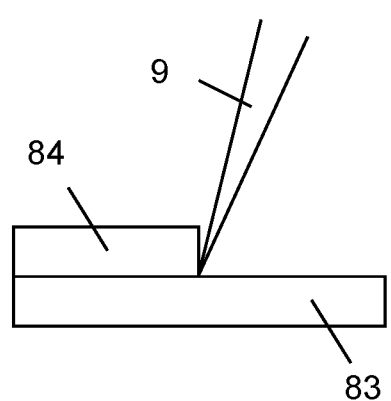
FIG. 3B shows a lap fillet joint.
Figure 3C:
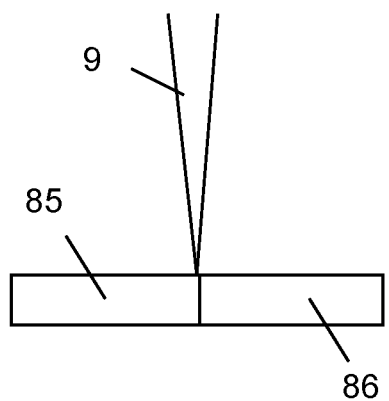
FIG. 3C shows a butt joint.
Figure 3D:
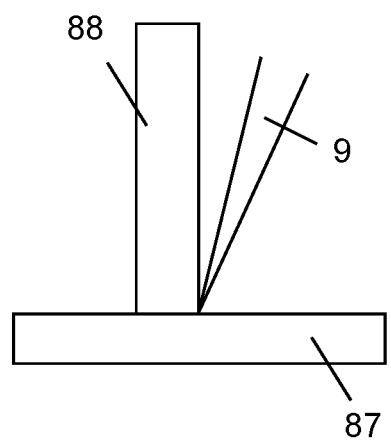
FIG. 3D shows a T fillet joint.

Herein, joint shapes are described more specifically with reference to FIGS. 3A through 3D. FIG. 3A shows a "lap joint" for welding a portion in which workpiece 81 and workpiece 82 are overlapped onto each other. FIG. 3B shows a "lap fillet joint" for welding an end portion of workpiece 84 overlapped onto workpiece 83. FIG. 3C shows a "butt joint" for welding a portion in which workpiece 85 and workpiece 86 are adjacent to each other when workpiece 85 and workpiece 86 are arranged. FIG. 3D shows a "T fillet joint" for welding a portion in which workpiece 87 and workpiece 88 are brought into contact with each other when workpiece 88 is disposed perpendicular to workpiece 87.

The material and the board thickness of a workpiece include the arrangement of the workpiece in the joint shape. For example, in FIG. 3A, the joint shape is a "lap joint" and the workpiece information includes the "material" and the "board thickness" of workpiece 81 "located in the lower side," and the "material" and the "board thickness" of workpiece 82 "located in the upper side."

Next, as shown in step 2 in FIG. 2, an operator inputs laser information indicating characteristics of laser light 9 into laser information input section 12 of welding condition setting unit 6 (a second step). The laser information includes a spot diameter of laser light 9 at a focal position, length from laser head 3 to the focal position (or focal length of laser light 9 by lens inside laser head 3), a length from laser head 3 to workpiece 8, and the like.

The workpiece information input into workpiece information input section 11 and the laser information input into laser information input section 12 are transmitted to welding condition calculation section 10 of controller 5.

Next, a recommended value, a recommended pattern, and an estimated value of the welding conditions are calculated by welding condition calculation section 10 based on the workpiece information and the laser information as shown in step 3 in FIG. 2, and then displayed on display section 13 of welding condition setting unit 6 as shown in step 4 in FIG. 2 (step 3 and step 4 together are defined as a third step). The welding conditions displayed at this time are defined as a first welding condition and a second welding condition. Each of the first welding condition and the second welding condition may be only one welding condition or two or more welding conditions. Each of the first welding condition and the second welding condition is a part of a plurality of welding conditions. Both the first welding condition and the second welding condition may constitute all the welding conditions. Both the first welding condition and the second welding condition may be a part of a plurality of welding conditions. The "welding condition" including the first welding condition and the second welding condition is, for example, a welding speed, laser power, and a welding pattern. A strength of a welded portion, a weld (depth) of the welded portion, and the like, which are derived from the above-mentioned conditions, are also included in the "welding condition." Then, the "welding condition" is a combination of an "item" and a "value (or a pattern)" related to welding.

Herein, differences of heat input depending on the four types of joint shapes shown in FIGS. 3A through 3D are described. Appropriate heat input for welding is different depending on the joint shape of workpiece 8. Assuming that workpieces 81 to 88 are made of the same material and have the same board thickness in FIGS. 3A through 3D.

In the "lap joint" shown in FIG. 3A, heat input to melt two workpieces, that is, workpiece 81 and workpiece 82, is required. This is because a plane portion of workpiece 81 and a plane portion of workpiece 82 are welded to each other.

In the "lap fillet joint" shown in FIG. 3B, heat input to melt more than one and less than two workpieces is required. Since a welded portion of workpiece 84 is an end portion, heat input necessary for only workpiece 84 is less than heat input to melt one workpiece, and workpiece 83 is melted by the remaining heat. This is because a plane portion of workpiece 83 and an end portion of workpiece 84 are welded to each other. When heat input that is the same as in the "lap joint" in FIG. 3A is carried out to the "lap fillet joint" in FIG. 3B, burn through of workpiece 83 occurs. Therefore, the heat input must be reduced in the "lap fillet joint" in FIG. 3B as compared with the case of the "lap joint" in FIG. 3A.

In the "butt joint" in FIG. 3C, since workpiece 85 and workpiece 86 are abutted to each other (arranged), heat input is required to be heat input to melt one workpiece. This is because an end portion of workpiece 85 and an end portion of workpiece 86 are welded to each other. Consequently, the heat input is reduced in the "butt joint" in FIG. 3C as compared with the case of the "lap fillet joint" in FIG. 3B.

The heat input of "T fillet joint" in FIG. 3D is required to be equal to that of the "lap fillet joint" in FIG. 3B. This is because a plane portion of workpiece 87 and an end portion of workpiece 88 are welded to each other in the "T fillet joint" in FIG. 3D, and because the welding conditions are near the conditions for welding of the "lap fillet joint" in FIG. 3B. In this way, heat input by laser light 9 is required to be changed depending on the joint shape of workpiece 8.

Furthermore, a welding pattern as an irradiation locus of laser light 9 is described. In the case of the "lap joint" shown in FIG. 3A, a target position of laser light 9 may be displaced by about several mm. Therefore, welding can be carried out in a straight line, circular, and C-type welding patterns. However, in cases where straight line welding is carried out by laser light 9 with respect to the "lap fillet joint" in FIG. 3B, the "butt joint" in FIG. 3C, and the "T fillet joint" in FIG. 3D, when a target position of laser light 9 is displaced by about several mm, both the workpieces cannot be melted. This is because it is necessary to weld an end portion of at least one workpiece. When the target position is displaced by about several mm in straight line welding, one workpiece is not melted, and burn-through or perforation occurs in the other workpiece. Furthermore, since a joined area between the workpieces is small in circular or C-shaped welding pattern, a strength may be insufficient. Accordingly, use of welding patterns such as weaving can melt both the workpieces continuously widely, and can complement the displacement of the target position. Thus, it is necessary to weld a workpiece in a welding pattern suitable for the joint shape.

Furthermore, time necessary for melting a workpiece is different depending on material or a board thickness of a workpiece. Difference in melting is caused by difference in a melting point or thermal conductivity by material of a workpiece, and difference in thermal diffusion by a board thickness or a joint shape of a workpiece. Therefore, it is necessary to determine an appropriate welding speed based on the material, the board thickness, and the joint shape of a workpiece.

Based on the above, laser welding device 1 in accordance with this exemplary embodiment has a function of determining an appropriate laser welding condition as mentioned below.

Welding condition calculation section 10 of controller 5 includes a arithmetic equation or a database, which associates the workpiece information including a joint shape and laser information with welding conditions. The welding conditions include a welding speed, laser power, and a welding pattern. A strength of a welded portion, a weld (depth) of the welded portion, and the like, which are derived from the above-mentioned conditions, are also included in the welding condition. That is to say, welding condition calculation section 10 has a arithmetic equation or a database, which associates the workpiece information and the laser information with a recommended welding speed, a recommended laser power, a recommended welding pattern, an estimated strength of the welded portion, an estimated weld (depth) of the welded portion, and the like.

Herein, a welding condition to be calculated by welding condition calculation section 10 may be added. For example, in a case where assist gas is fed to a welded portion, types of gases or feed amount of gas may be calculated by welding condition calculation section 10. Furthermore, for example, in a case where filler wire is fed to a welded portion, a diameter or feeding speed of the filler wire may be calculated by welding condition calculation section 10. As mentioned above, in step 3 in FIG. 2, welding condition calculation section 10 calculates the recommended value, the recommended pattern, or the estimated value of welding conditions.

Then, in step 4 in FIG. 2, the recommended value, the recommended pattern, or the estimated value of welding conditions calculated by welding condition calculation section 10 are displayed on display section 13 of welding condition setting unit 6.

Herein, an example of the method for determining laser welding condition of this exemplary embodiment is described specifically.

Firstly, in step 1, an operator inputs "joint shape: T fillet welding," "material of workpiece 87: Aluminum 5000," "material of workpiece 88: Aluminum 5000," "board thickness of workpiece 87: 1.0 mm," and "board thickness of workpiece 88: 1.0 mm" as the workpiece information into workpiece information input section 11.

Subsequently, in step 2, the operator inputs "spot diameter: 0.6 mm," and "length from the laser head to workpiece 8: 300 mm" as the laser information into laser information input section 12.

Subsequently, in step 3, welding condition calculation section 10 calculates "recommended laser power: 2 kW," "recommended welding speed: 2 m/min," "recommended welding pattern: weaving," "estimated strength: 4000 N," and "estimated weld (depth): 0.6 mm". Then, in step 4, display section 13 display the above-mentioned welding conditions.

Thereafter, based on the calculated welding conditions, laser welding device 1 welds workpiece 8.

Thus, even for an operator having little experience of laser welding, time or labor for obtaining a welding condition can be reduced. Furthermore, it is possible to reduce workpieces to be used only for obtaining welding conditions and then to be discarded.

Note here that in the laser welding device of this exemplary embodiment, welding condition calculation section 10 is provided inside controller 5. However, welding condition calculation section 10 may be provided inside welding condition setting unit 6. Furthermore, a configuration in which welding condition setting unit 6 and controller 5 may be unitarily formed may be employed. Furthermore, the welded portion may be further provided with an assist gas feeder for feeding assist gas, and the assist gas feeder may be controlled by controller 5. Furthermore, the welded portion may be provided with a filler wire feeder for feeding a filler wire, and the filler wire feeder may be controlled by controller 5.

Furthermore, the arithmetic equation or the database provided in welding condition calculation section 10 may be constructed based on, for example, values measured by experimental laser welding. Furthermore, the input of a board thickness of a workpiece into workpiece information input section 11 is carried out every 0.1 mm. The input of the material of a workpiece into workpiece information input section 11 includes soft steel, galvanization, a plating amount, Aluminum 5000, SUS 430, and the like.

Second Exemplary Embodiment

Figure 5:
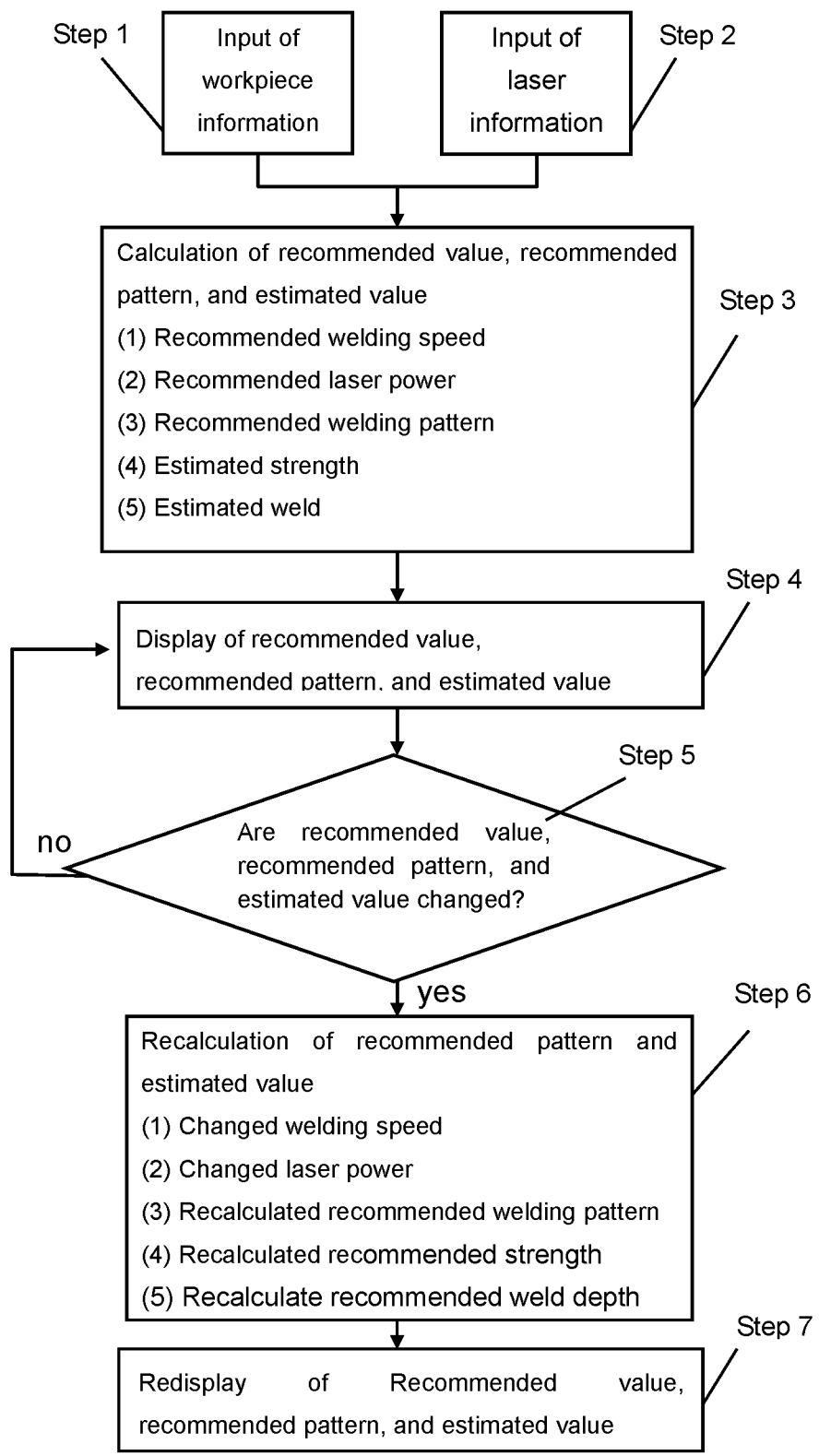
FIG. 5 is a flowchart showing a procedure to determine laser welding conditions in accordance with the second exemplary embodiment.

This exemplary embodiment is described with reference to FIGS. 4 and 5. FIG. 4 shows a schematic configuration of a laser welding device. FIG. 5 is a flowchart showing a procedure to determine laser welding conditions. In this exemplary embodiment, the same reference numerals are given to the same configurations as in the first exemplary embodiment, and description therefor is omitted. This exemplary embodiment is different from the first exemplary embodiment in that when welding condition calculation section 10 calculates a recommended value, a recommended pattern, an estimated value of welding conditions, displays them on display section 13, and then further changes the welding conditions, welding condition calculation section 10 recalculates (updates) the recommended value, the recommended pattern, and the estimated value of the welding conditions, and displays them on display section 13.

As shown in FIG. 4, laser welding device 21 of this exemplary embodiment further includes parameter change input section 14 in welding condition setting unit 6 in laser welding device 1 in the first exemplary embodiment. Furthermore, as shown in FIG. 5, a method for determining a laser welding condition of this exemplary embodiment further includes step 5, step 6, and step 7 after step 4 of the first exemplary embodiment.

Next, a method for determining a laser welding condition by laser welding device 21 before execution of welding is described with reference to FIGS. 4 and 5. Steps 1 to 4 in FIG. 5 are the same as steps 1 to 4 in FIG. 2 of the first exemplary embodiment.

As shown in step 5 in FIG. 5, an operator can change a welding condition displayed on display section 13, that is, a recommended laser power, a recommended welding speed, a recommended welding pattern, an estimated strength of the welded portion, and an estimated weld depth of the welded portion. In other words, the operator changes the first welding condition to a third welding condition. In detail, the first welding condition and the third welding condition are the same as each other in items and different from each other in values (or patterns). In step 5, in a case where the operator does not change the welding conditions, the display of step 4 is maintained.

In this exemplary embodiment, a case where an operator changes, for example, a welding speed and laser power is described. In step 5, the operator operates parameter change input section 14 and changes a recommended welding speed and a recommended laser power (a fourth step). At this time, display section 13 displays the changed welding speed and changed laser power.

As shown in step 6 in FIG. 5, welding condition calculation section 10 recalculates not-changed welding conditions (a welding pattern, a strength of a welded portion, and a weld depth of the welded portion) from workpiece information, laser information, and changed welding conditions (a welding speed and laser power) based on a arithmetic equation or a database stored inside welding condition calculation section 10. Subsequently, as shown in step 7 in FIG. 5, the changed welding conditions and the recalculated welding conditions are displayed on display section 13 of welding condition setting unit 6 (step 6 and step 7 together are referred to as a fifth step). In other words, the second welding condition is changed to a fourth welding condition and then displayed. In addition, the second welding condition and the fourth welding condition are the same as each other in items and different from each other in values (or patterns).

Note here that in step 6, as to the welding condition in which recalculated results are the same as those calculated in step 3, display of step 4 is maintained in step 7.

Herein, an example of the method for determining a laser welding condition of this exemplary embodiment is shown specifically. Steps 1 to 4 are the same as specific examples of the first exemplary embodiment.

In step 5, an operator changes the "recommended laser power: 2 kW" and "recommended welding speed: 2 m/min" which are displayed on display section 13 to the "recommended laser power: 4 kW" and the "recommended welding speed: 3 m/min."

With this change, in step 6, welding condition calculation section 10 calculates the "recommended welding pattern: weaving," the "estimated strength: 4500 N," and the "estimated weld (depth): 0.8 mm" Herein, the estimated strength and the estimated weld (depth) are changed, and the recommended welding pattern is not changed. Then, in step 7, display section 13 displays the above-mentioned new welding conditions.

As mentioned above, according to this exemplary embodiment, also when an operator changes the welding conditions calculated by welding condition calculation section 10, other welding conditions that have not changed can be recalculated and displayed. Furthermore, change of the welding condition may be repeated two or more times. That is to say, it is possible to repeat steps 5 to 7.

Thus, an operator can further make a fine adjustment to the welding condition. Also in the fine adjustment, the same effect as in the first exemplary embodiment can be exhibited again. That is to say, other welding conditions are optimized in response to the fine adjustment by the operator.

Note here that the welding conditions changed by an operator is not necessarily limited to two, and one or three or more welding conditions may be changed. In once change and recalculation of the welding conditions (one cycle of steps 5 to 7), change of all the welding conditions cannot be carried out. However, as a result of changing the welding condition and recalculation two or more times, all the welding conditions can be carried out.

INDUSTRIAL APPLICABILITY

A method for determining a laser welding condition and a laser welding device of the present disclosure can set an optimum welding condition considering a shape of a joint even in welding, and industrially applicable.

The invention claimed is:
1. A method for determining a laser welding condition, the method comprising:
   a first step of receiving an input of workpiece information indicating characteristics of a workpiece, the workpiece information including material, a board thickness, and a joint shape of the workpiece;
   a second step of receiving an input of laser information indicating characteristics of laser light; and
   a third step of calculating any one of a recommended laser power of the laser light, a recommended welding speed, a recommended welding pattern, an estimated strength of a welded portion, and an estimated weld depth of the welded portion, as a first welding condition based on a computing equation or a database, which associates the workpiece information and the laser information with the recommended laser power of the laser light, the recommended welding speed, the recommended welding pattern, the estimated strength of the welded portion, and the estimated weld depth of the welded portion, and displaying the first welding condition.

2. The method for determining a laser welding condition of claim 1, further comprising:
a fourth step of changing the displayed first welding condition, which has been calculated and displayed by the third step, and
a fifth step of calculating a second welding condition different from the first welding condition based on the computing equation or the database, which associates the workpiece information and the laser information with the recommended laser power of the laser light, the recommended welding speed, the recommended welding pattern, the estimated strength of the welded portion, and the estimated weld depth of the welded portion, and displaying the second welding condition,
wherein after the third step, the fourth step changes the first welding condition to a third welding condition, and displays the third welding condition which has been changed from the first welding condition,
after the fourth step, the fifth step changes the second welding condition to a fourth welding condition, and displays the fourth welding condition, and
the second welding condition is any one of the recommended laser power of the laser light, the recommended welding speed, the recommended welding pattern, the estimated strength of the welded portion, and the estimated weld depth of the welded portion.

3. The method for determining a laser welding condition of claim 1, wherein the laser information includes a spot diameter and a focal length of the laser light.

4. A laser welding device comprising:
a laser oscillator;
a laser head emitting laser light, output from the laser oscillator, to a workpiece;
a robot for moving the laser head attached to the robot;
a controller configured to control an operation of the robot and have a welding condition calculation section; and
a welding condition setting unit connected to the controller,
wherein the welding condition setting unit includes:
a workpiece information input section for inputting workpiece information indicating characteristics of the workpiece, the workpiece information including material, a board thickness, and a joint shape of the workpiece,
a laser information input section for inputting laser information indicating characteristics of the laser light, and
a display section for displaying a first welding condition calculated by the welding condition calculation section based on a computing equation or a database, which associates the workpiece information and the laser information with a recommended laser power of the laser light, a recommended welding speed, a recommended welding pattern, an estimated strength of a welded portion, and an estimated weld depth of the welded portion, and
the first welding condition calculated by the welding condition calculation section is any one of the recommended laser power of the laser light, the recommended welding speed, the recommended welding pattern, the estimated strength of the welded portion, and the estimated weld depth of the welded portion.

5. The laser welding device of claim 4, wherein
the welding condition setting unit further includes a parameter change input section,
when the first welding condition is displayed on the display section, and then the displayed first welding condition is changed by the parameter change input section, the welding condition calculation section calculates a second welding condition different from the first welding condition based on the computing equation or the database, which associates the workpiece information and the laser information with the recommended laser power of the laser light, the recommended welding speed, the recommended welding pattern, the estimated strength of the welded portion, and the estimated weld depth of the welded portion, and displays the second welding condition on the display section,
when the parameter change input section changes the first welding condition to a third welding condition, the welding condition calculation section changes the second welding condition to a fourth welding condition, and
displays the third welding condition and the fourth welding condition on the display section, and
the second welding condition is any one of the recommended laser power of the laser light, the recommended welding speed, the recommended welding pattern, the estimated strength of the welded portion, and the estimated weld depth of the welded portion.

6. The laser welding device of claim 5, wherein the second welding condition and the fourth welding condition are the estimated strength of the welded portion.

7. The laser welding device of claim 4, wherein the laser information includes a spot diameter and a focal length of the laser light.

8. The method for determining a laser welding condition of claim 2, wherein the laser information includes a spot diameter and a focal length of the laser light.

9. The laser welding device of claim 5, wherein the laser information includes a spot diameter and a focal length of the laser light.

* * * * *